(12) United States Patent
Chen et al.

(10) Patent No.: US 10,367,564 B2
(45) Date of Patent: Jul. 30, 2019

(54) CHANNEL STATE INFORMATION FEEDBACK METHOD AND RELATED DEVICE FOR FD MIMO SYSTEM

(71) Applicant: China Academy of Telecommunications Technology, Beijing (CN)

(72) Inventors: Wenhong Chen, Beijing (CN); Runhua Chen, Beijing (CN); Tamrakar Rakesh, Beijing (CN); Qiubin Gao, Beijing (CN); Hui Li, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 15/749,054

(22) PCT Filed: Jul. 25, 2016

(86) PCT No.: PCT/CN2016/091630
§ 371 (c)(1),
(2) Date: Jan. 30, 2018

(87) PCT Pub. No.: WO2017/020749
PCT Pub. Date: Feb. 9, 2017

(65) Prior Publication Data
US 2018/0234154 A1 Aug. 16, 2018

(30) Foreign Application Priority Data
Jul. 31, 2015 (CN) .......................... 2015 1 0463576

(51) Int. Cl.
*H04L 5/12* (2006.01)
*H04B 7/06* (2006.01)
(Continued)

(52) U.S. Cl.
CPC ......... *H04B 7/0626* (2013.01); *H04B 7/0417* (2013.01); *H04B 7/0456* (2013.01);
(Continued)

(58) Field of Classification Search
CPC .. H04B 7/0626; H04B 7/0417; H04B 7/0639; H04B 7/0456; H04B 7/063;
(Continued)

(56) References Cited

U.S. PATENT DOCUMENTS

2013/0242773 A1  9/2013  Wernersson et al.
2014/0294108 A1  10/2014  Etkin et al.
(Continued)

FOREIGN PATENT DOCUMENTS

| CN | 103716116 A | 4/2014 |
|---|---|---|
| CN | 104348592 | 2/2015 |
| CN | 104811231 A | 7/2015 |

OTHER PUBLICATIONS

Physical layer procedures (Release 12), 3GPP TS 36.213 v12.6.0, 3rd Generation Partnership Project; Technical Specification Group Radio Access Network; Evolved Universal Terrestrial Radio Access (E-UTRA); pp. 74-114, Jun. 2015.
(Continued)

*Primary Examiner* — Dhaval V Patel
(74) *Attorney, Agent, or Firm* — Foley & Lardner LLP

(57) ABSTRACT

The present invention discloses a channel state information (CSI) feedback method and related device for an FD MIMO system, and is configured to support the scenario in which various CSI related information needs to be fed back after a CSI measurement in an FD MIMO system. The method comprises: a terminal receives a CSI feedback configuration group indicated by a base station and configuration information for performing a CSI feedback based on the CSI feedback configuration group; and the terminal performs a
(Continued)

CSI measurement and feedback according to the CSI feedback configuration group and the configuration information, wherein the CSI feedback configuration group comprises at least one CSI feedback configuration, and the CSI feedback configuration is a downlink signal configuration for a downlink CSI measurement and feedback.

18 Claims, 5 Drawing Sheets

(51) Int. Cl.
*H04B 7/0456* (2017.01)
*H04B 7/0417* (2017.01)
*H04L 1/00* (2006.01)
*H04L 5/00* (2006.01)
*H04W 72/04* (2009.01)

(52) U.S. Cl.
CPC ......... *H04B 7/0639* (2013.01); *H04L 1/0026* (2013.01); *H04L 5/0048* (2013.01); *H04B 7/063* (2013.01); *H04L 5/0057* (2013.01); *H04W 72/042* (2013.01)

(58) Field of Classification Search
CPC ... H04L 1/0026; H04L 5/0048; H04L 5/0057; H04W 72/042
USPC ....... 375/262, 260, 267, 295, 316, 340, 343; 370/252, 329, 338
See application file for complete search history.

(56) References Cited

U.S. PATENT DOCUMENTS

2015/0043673 A1 2/2015 Lee et al.
2018/0183556 A1* 6/2018 Shin .................. H04L 5/0051

OTHER PUBLICATIONS

Ericsson, et al., "Merged WFs on CSI reporting," R1-152425, 3GPP TSG-RAN WG1 Meeting #80bis, Agenda Item 7.2.5.2.1, Apr. 2015.
Samsung, "CSI Reporting Types for Rel.13 FD-MIMO," R1-153387, 3GPP TSG RAN WG1 Meeting #81, Agenda Item 6.2.5.2.1, May 2015.
Samsung, "Presentation of Specification/Report to TSG: TR 36.897 v 1.0.1 on Study on Elevation Beamforming/Full-Dimension (FD) MIMO for LTE," RP-150735, 3GPP TSG RAN Meeting #68, Agenda Item 12.4.2, Jun. 2015.
Configuration and Control Signaling for Rel 13 Fd-MIMO 3GPP Draft; R1-153386 Control Sig FDMIMO, $3^{rd}$ Generation Partnership Project (3GPP), retrieved from the internet on May 5, 2014.
3G$3^{rd}$ Generation Partnership Project (3GPP), PP Draft, R1-151771 Implementation Based 3D CSI Feedback Using Multiple CSI Processes Final, retrieved from the internet Apr. 19, 2005.
Ericsson: "Enhancements for beamformed CSI-RS". 3GPP Draft; RI-153175 Enhancements for Beamformed CSI-RS, 3rd Generation Partnership Project (3GPP), Mobile Competence Centre . 650, Route Des Lucioles • F-06921 Sophia-Antipolis Cedex, France, vol. RAN WGI, No. Fukuoka, Japan; May 25, 2015-May 29, 2015 Dtd May 24, 2015.

* cited by examiner

CHANNEL STATE INFORMATION FEEDBACK METHOD AND RELATED DEVICE FOR FD MIMO SYSTEM

This application is a US National Stage of International Application No. PCT/CN2016/091630, filed on Jul. 25, 2016, designating the United States, and claiming the benefit of Chinese Patent Application No. 201510463576.6, filed with the Chinese Patent Office on Jul. 31, 2015 and entitled "A method and related device for feeding back channel state information in an FD MIMO system", which is hereby incorporated by reference in its entirety.

FIELD

The present invention relates to the field of communications, and particularly to a method and related device for feeding back channel state information in a Full-Dimension (FD) Multiple Input Multiple Output (MIMO) system.

BACKGROUND

In the existing cellular system, an antenna array in a base station is generally arranged horizontally. As shown in FIG. 1, in which dual-polarized antennas which are arranged horizontally are illustrated, and FIG. 2 in which an array of antennas which are arranged horizontally is illustrated. Since the array of antennas in the base station is arranged horizontally so that a beam of a transmitter in the base station has a fixed downward inclination angle, and can only be adjusted in the horizontal direction, which result in various existing beam-forming/pre-coding technologies, etc., merely based on channel information in the horizontal direction. In fact, since a radio signal is propagated in three dimensions in a space, the performance of the system cannot be optimized with the fixed downward inclination angle of a beam in the vertical direction, and adjustment of the beam in the vertical direction is of great significance to a reduction in inter-cell interference, and an improvement in performance of the system.

As the antenna technologies are advancing, an array of active antennas in which each array element can be controlled separately has emerged in the industry, thus making it possible to adjust dynamically the beam in the vertical direction. As shown in FIG. 3, in which dual-polarized antennas arranged in the horizontal and vertical directions are illustrated, and in FIG. 4, in which an array of antennas arranged in the horizontal and vertical directions is illustrated. The MIMO technology in the array of antennas arranged in the horizontal and vertical directions will be referred in this context to as FD MIMO or three-dimension (3D) MIMO.

In the 3D antenna array illustrated in FIG. 3 and FIG. 4, a transmitting signal of the base station can be used for beam-forming on a UE in both the horizontal direction and the vertical direction. In order to enable the base station to determine a beam-forming vector in the vertical direction for enabling the beam in the vertical direction to be oriented to the UE so as to maximum a beam-forming gain, the UE typically needs to feed back Channel State Information (CSI) in the vertical direction.

The UE typically feeds back CSI in the vertical direction by transmitting a beamformed CSI measurement pilot. Taking the transmission of Channel State Information Reference Signal (CSI-RS) as an example, the UE is configured with a plurality of CSI-RS resources, and different CSI-RS resources are configured with different vertical beam-forming vectors. The UE feeds back CSI based upon the optimum CSI-RS, and notifies the base station of positional information of the optimum CSI-RS, so that the base station can perform vertical beam-forming using the optimum vertical beam-forming vector. The CSI generally includes a Rank Indication (RI), a Pre-coding Matrix Indicator (PMI), and a Channel Quality Indication (CIQ). In a particular implementation, the UE can report positional information and CSI corresponding to a plurality of optimum CSI-RS resources, so that the base station selects one or more different vertical beams therefrom for transmission of downlink data. In this implementation, the number of ports of a CSI-RS resource is less than the total number of antenna elements, and the same as the number of antenna elements in the horizontal dimension, particularly as illustrated in FIG. 5.

The UE feeds back CSI in the two dimensions, i.e., the vertical and horizontal dimensions, by transmitting a non-precoded CSI-RS, that is, more CSI-RS resource ports are configured, where a part of the CSI-RS resource ports are mapped onto horizontal antenna elements, and the other part of the CSI-RS resource ports are mapped onto vertical antenna elements; and a CSI-RS signal is transmitted in the two dimensions, i.e., the vertical and horizontal dimensions, and the UE can obtain two-dimension CSI according to the CSI-RS to thereby feed back the downlink CSI. In this implementation, more CSI-RS resource ports are required, and the UE can feed back CSI in substantially the same way as the prior art, that is, the UE can measure and make a feedback directly over the CSI-RS resources without feeding back the CSI separately in the respective dimensions.

In a Long Term Evolution (LTE) system, in order to support Cooperative Multiple Point Transmission (CoMP), the concept of a CSI process has been introduced. Each CSI process can correspond to a downlink transmission point, and is configured with a Non-Zero Power (NZP) CSI-RS and an Interference Measurement Resource (IMR). The UE performs channel measurement based upon the NZP CSI-RS, and performs interference measurement over the corresponding IMR to thereby obtain and feed back CSI corresponding to the respective CSI processes. Each LTE UE can be configured with at most three CSI processes to feed back CSI. The UE can feed back CSI over a periodical PUCCH, or an aperiodical PUSCH. When the CSI is fed back periodically, the base station configures a periodical PUCCH resource, and the UE reports corresponding CSI periodically over the configured resource. When the CSI is fed back aperiodically, the base station triggers the UE via DCI to feed back CSI, and the UE feeds back CSI over a PUSCH in an uplink sub-frame corresponding to a triggering sub-frame. For the aperiodical feedback, the base station can trigger the UE to report CSI corresponding to each CSI process in certain set of CSI processes.

At present, only CSI is fed back in a CSI process in the FD MIMO system, so the feedback approach is inflexible, and cannot support the CSI feedback in a scenario in which various CSI related information needs to be fed back after the CSI is measured. For example, the feedback approach cannot support the CSI feedback by transmitting a beam-formed CSI measurement pilot (CSI-RS), or that by transmitting a non-precoded CSI-RS.

SUMMARY

Embodiments of the invention provide a method and related device for feeding back channel state information in an FD MIMO system so as to support a scenario in which various CSI related information needs to be fed back after CSI is measured in the FD MIMO system.

Particular technical solutions according to the embodiments of the invention are as follows.

In a first aspect, there is provided a method for feeding back channel state information in a Full-Dimension (FD) Multiple Input Multiple Output (MIMO) system, the method including:

receiving, by a terminal, a set of Channel State Information (CSI) feedback configurations, and configuration information for feeding back CSI based upon the set of CSI feedback configurations, indicated by a base station; and measuring and feeding back, by the terminal, CSI according to the set of CSI feedback configurations, and the configuration information;

where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration.

Where the configuration information includes any one or more of:

transmission mode indication information, wherein the transmission mode is a beam-formed CSI measurement pilot transmission mode, or a non-precoded CSI measurement pilot transmission mode;

CSI feedback mode indication information, wherein the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel, PUCCH;

indication information of a downlink channel information item to be fed back over a Physical Uplink Shared Channel, PUSCH;

codebook indication information of a codebook to be used in calculating CSI; and a codebook subset restriction indicator indicating codewords currently available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, if the configuration information includes the transmission mode indication information, then reporting, by the terminal, CSI based upon the configuration information includes:

if it is determined that the transmission mode indication information indicates the beam-formed CSI measurement pilot transmission mode, then reporting, by the terminal, positional information and CSI corresponding to the optimum CSI feedback configuration in the set of CSI feedback configurations; and if it is determined that the transmission mode indication information indicates the non-precoded CSI measurement pilot transmission mode, then reporting, by the terminal, CSI corresponding to each CSI feedback configuration in the set of CSI feedback configurations.

In an implementation, receiving, by the terminal, the set of CSI feedback configurations, and the configuration information for feeding back CSI based upon the set of CSI feedback configurations, indicated by the base station includes:

if the configuration information comprises the transmission mode indication information, then determining, by the terminal, a quantity of CSI feedback configurations corresponding to a transmission mode indicated by the transmission mode indication information, and receiving indication information of the CSI feedback configuration indicated by the base station according to the quantity of CSI feedback configurations.

In an implementation, if the configuration information includes the CSI feedback mode indication information, then reporting, by the terminal, CSI based upon the configuration information includes:

reporting, by the terminal, CSI corresponding to each CSI feedback configuration according to the CSI feedback mode indication information, or reporting positional information and CSI corresponding to the optimum CSI feedback configuration according to the CSI feedback mode indication information.

In an implementation, if the configuration information includes the indication information of a downlink channel information item to be fed back over a PUCCH, then reporting, by the terminal, CSI based upon the configuration information includes:

if it is determined that the indication information of a downlink channel information item to be fed back over a PUCCH is the first indication information, reporting over a PUCCH, by the terminal, positional information and CSI corresponding to the optimum CSI feedback configuration in the set of CSI feedback configurations;

if it is determined that the indication information of a downlink channel information item to be fed back over a PUCCH is the second indication information, reporting over a PUCCH, by the terminal, positional information and CSI corresponding to the CSI feedback configuration, specified by the base station, in the set of CSI feedback configurations; and if it is determined that the indication information of a downlink channel information item to be fed back over a PUCCH is the third indication information, reporting over a PUCCH, by the terminal, positional information and CSI corresponding to each CSI feedback configuration in the set of CSI feedback configurations.

In an implementation, if the configuration information includes the indication information of a downlink channel information item to be fed back over a PUSCH, then reporting, by the terminal, CSI based upon the configuration information includes:

if it is determined that the indication information of a downlink channel information item to be fed back over a PUSCH is the first indication information, then reporting over a PUSCH, by the terminal, positional information and CSI corresponding to the optimum CSI feedback configuration in the set of CSI feedback configurations;

if it is determined that the indication information of a downlink channel information item to be fed back over a PUSCH is the second indication information, then reporting over a PUSCH, by the terminal, positional information of the optimum CSI feedback configuration in the set of CSI feedback configurations;

if it is determined that the indication information of a downlink channel information item to be fed back over a PUSCH is the third indication information, then reporting over a PUSCH, by the terminal, CSI corresponding to a CSI feedback configuration, corresponding to latest reported positional information, in the set of CSI feedback configurations;

if it is determined that the indication information of a downlink channel information item to be fed back over a PUSCH is the fourth indication information, then reporting over a PUSCH, by the terminal, CSI corresponding to a CSI feedback configuration, specified by the base station, in the set of CSI feedback configurations; and if it is determined that the indication information of a downlink channel information item to be fed back over a PUSCH is the fifth indication information, then reporting over a PUSCH, by the terminal, CSI corresponding to each CSI feedback configuration in the set of CSI feedback configurations.

In an implementation, if the configuration information includes the codebook indication information, then the method further includes:

determining, by the terminal, a codebook to be used in calculating CSI during CSI measurement, according to the codebook indication information.

In an implementation, determining, by the terminal, the codebook to be used in calculating CSI while measuring the CSI, according to the codebook indication information includes:

determining, by the terminal, a codebook in a set of preset codebooks, an index of which is the codebook indication information, and taking the determined codebook as the codebook to be used in calculating CSI;

or determining, by the terminal, a subset of a preset codebook according to values of respective bits in the codebook indication information, and taking the determined subset as the codebook to be used in calculating CSI, wherein each bit in the code indication information corresponds to a codeword in the preset codebook;

or obtaining, by the terminal, a generation matrix of a target codebook according to the codebook indication information, determining the target codebook according to the generation matrix and a preset codebook, and taking the target codebook as the codebook to be used in calculating CSI;

or obtaining, by the terminal, generation parameters of a target codebook according to the codebook indication information, and generating the target codebook according to the generation parameters of the codebook and a preset rule.

In an implementation, if the configuration information includes the codebook subset restriction indicator, then the method further includes:

determining, by the terminal, codewords currently available in a predefined codebook according to the codebook subset restriction indicator.

In a second aspect, there is provided a method for obtaining channel state information in a Full-Dimension (FD) Multiple Input Multiple Output (MIMO) system, the method including:

transmitting, by a base station, a set of Channel State Information, CSI, feedback configurations, and configuration information for feeding back CSI based upon the set of CSI feedback configurations, to a terminal; and receiving, by the base station, information fed back by the terminal according to the set of CSI feedback configurations, and the configuration information;

where the set of CSI feedback configurations comprises at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration.

Where the configuration information includes any one or more of:

transmission mode indication information, wherein the transmission mode is a beam-formed CSI measurement pilot transmission mode, or a non-precoded CSI measurement pilot transmission mode;

CSI feedback mode indication information, wherein the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel, PUCCH;

indication information of a downlink channel information item to be fed back over a Physical Uplink Shared Channel, PUSCH;

codebook indication information of a codebook to be used in calculating CSI; and a codebook subset restriction indicator indicating codewords currently available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Wherein the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In a third aspect, there is provided a terminal including:

a receiving module configured to receive a set of Channel State Information, CSI, feedback configurations, and configuration information for feeding back CSI based upon the set of CSI feedback configurations, indicated by a base station; and a processing module configured to measure and feed back CSI according to the set of CSI feedback configurations, and the configuration information;

where the set of CSI feedback configurations comprises at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration.

Where the configuration information includes any one or more of:

transmission mode indication information, wherein the transmission mode is a beam-formed CSI measurement pilot transmission mode, or a non-precoded CSI measurement pilot transmission mode;

CSI feedback mode indication information, wherein the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel, PUCCH;

indication information of a downlink channel information item to be fed back over a Physical Uplink Shared Channel, PUSCH;

codebook indication information of a codebook to be used in calculating CSI; and a codebook subset restriction indicator indicating codewords currently available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the processing module is configured:

if the configuration information comprises the transmission mode indication information, and it is determined that the transmission mode indication information indicates the beam-formed CSI measurement pilot transmission mode, to report positional information and CSI corresponding to the optimum CSI feedback configuration in the set of CSI feedback configurations; and if the configuration information comprises the transmission mode indication information, and it is determined that the transmission mode indication information indicates the non-precoded CSI measurement pilot transmission mode, to report CSI corresponding to each CSI feedback configuration in the set of CSI feedback configurations.

In an implementation, the receiving module is configured:

if the configuration information comprises the transmission mode indication information, to determine a quantity of CSI feedback configurations corresponding to a transmission mode indicated by the transmission mode indication information, and to receive indication information of the CSI feedback configuration indicated by the base station according to the quantity of CSI feedback configurations.

In an implementation, the processing module is configured:

if the configuration information comprises the CSI feedback mode indication information, to report CSI corresponding to each CSI feedback configuration according to the CSI feedback mode indication information, or to report positional information and CSI corresponding to the optimum CSI feedback configuration according to the CSI feedback mode indication information.

In an implementation, the processing module is configured:

if the configuration information comprises the indication information of a downlink channel information item to be fed back over a PUCCH, and if it is determined that the indication information of a downlink channel information item to be fed back over a PUCCH is the first indication information, to report positional information and CSI corresponding to the optimum CSI feedback configuration in the set of CSI feedback configurations over a PUCCH;

if it is determined that the indication information of a downlink channel information item to be fed back over a PUCCH is the second indication information, to report positional information and CSI corresponding to the CSI feedback configuration, specified by the base station, in the set of CSI feedback configurations over a PUCCH; and if it is determined that the indication information of a downlink channel information item to be fed back over a PUCCH is the third indication information, to report positional information and CSI corresponding to each CSI feedback configuration in the set of CSI feedback configurations over a PUCCH.

In an implementation, the processing module is configured:

if the configuration information comprises the indication information of a downlink channel information item to be fed back over a PUSCH, and if it is determined that the indication information of a downlink channel information item to be fed back over a PUSCH is the first indication information, to report positional information and CSI corresponding to the optimum CSI feedback configuration in the set of CSI feedback configurations over a PUSCH;

if it is determined that the indication information of a downlink channel information item to be fed back over a PUSCH is the second indication information, to report positional information of the optimum CSI feedback configuration in the set of CSI feedback configurations over a PUSCH;

if it is determined that the indication information of a downlink channel information item to be fed back over a PUSCH is the third indication information, to report CSI corresponding to a CSI feedback configuration, corresponding to latest reported positional information, in the set of CSI feedback configurations over a PUSCH;

if it is determined that the indication information of a downlink channel information item to be fed back over a PUSCH is the fourth indication information, to report CSI corresponding to a CSI feedback configuration, specified by the base station, in the set of CSI feedback configurations over a PUSCH; and if it is determined that the indication information of a downlink channel information item to be fed back over a PUSCH is the fifth indication information, to report CSI corresponding to each CSI feedback configuration in the set of CSI feedback configurations over a PUSCH.

In an implementation, the processing module is configured:

if the configuration information includes the codebook indication information, to determine a codebook to be used in calculating CSI during CSI measurement, according to the codebook indication information.

In an implementation, the processing module is configured:

to determine a codebook in a set of preset codebooks, an index of which is the codebook indication information, and to take the determined codebook as the codebook to be used in calculating CSI;

or to determine a subset of a preset codebook according to values of respective bits in the codebook indication information, and to take the determined subset as the codebook to be used in calculating CSI, wherein each bit in the code indication information corresponds to a codeword in the preset codebook;

or to obtain a generation matrix of a target codebook according to the codebook indication information, to determine the target codebook according to the generation matrix and a preset codebook, and to take the target codebook as the codebook to be used in calculating CSI;

or to obtain generation parameters of a target codebook according to the codebook indication information, and to generate the target codebook according to the generation parameters of the codebook, and a preset rule.

In an implementation, the processing module is configured:

if the configuration information includes the codebook subset restriction indicator, to determine codewords currently available in a predefined codebook according to the codebook subset restriction indicator.

In a fourth aspect, there is provided a base station including:

a transmitting module configured to transmit a set of Channel State Information, CSI, feedback configurations, and configuration information for feeding back CSI based upon the set of CSI feedback configurations, to a terminal; and a receiving module configured to receive information fed back by the terminal according to the set of CSI feedback configurations, and the configuration information, where the set of CSI feedback configurations comprises at least one CSI feedback configuration, and the CSI feedback configuration is a downlink signal configuration for measuring and feeding back downlink CSI.

In a fifth aspect, there is provided a terminal generally including a processor, a memory, and a transceiver, where the transceiver is configured to be controlled by the processor to receive and transmit data, the memory is configured to store preset program, and the processor is configured to read the program in the memory, and to execute the program:

to receive a set of Channel State Information (CSI) feedback configurations, and configuration information for feeding back CSI based upon the set of CSI feedback configurations, indicated by a base station through the transceiver; and to measure and feed back CSI according to the set of CSI feedback configurations, and the configuration information;

where the set of CSI feedback configurations includes at least one CSI feedback configuration, and the CSI feedback configuration is a downlink signal configuration for measuring and feeding back downlink CSI.

In an implementation, the CSI feedback configuration is a CSI process, a non-zero power CSI measurement resource configuration, or an interference measurement resource configuration.

In an implementation, the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

In an implementation, the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

In an implementation, the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to the latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the processor is configured:

if the configuration information includes the transmission mode indication information, then if the processor determines that the transmission mode indication information indicates the beam-formed CSI measurement pilot transmission mode, to report positional information and CSI corresponding to the optimum CSI feedback configuration in the set of CSI feedback configurations; and if the processor determines that the transmission mode indication information indicates the non-precoded CSI measurement pilot transmission mode, to report CSI corresponding to each CSI feedback configuration in the set of CSI feedback configurations.

In an implementation, the transmission mode indication information further indicates the number of CSI feedback configurations in the set of CSI feedback configurations configured by the base station, and the processor is configured:

if the configuration information includes the transmission mode indication information, to determine the number of CSI feedback configurations corresponding to the transmission mode indicated by the transmission mode indication information, and to instruct the transceiver to receive indication information of the CSI feedback configuration(s) indicated by the base station according to the number of CSI feedback configurations.

In an implementation, the processor is configured:

if the configuration information includes the CSI feedback mode indication information, to report CSI corresponding to each CSI feedback configuration through the transceiver according to the CSI feedback mode indication information, or to report positional information and CSI corresponding to the optimum CSI feedback configuration through the transceiver according to the CSI feedback mode indication information.

In an implementation, the processor is configured:

if the configuration information includes the indication information of a downlink channel information item to be fed back over a PUCCH, and if it is determined that the indication information of a downlink channel information item to be fed back over a PUCCH is the first indication information, to instruct the transceiver to report positional information and CSI corresponding to the optimum CSI feedback configuration in the set of CSI feedback configurations over a PUCCH;

if it is determined that the indication information of a downlink channel information item to be fed back over a PUCCH is the second indication information, to instruct the transceiver to report positional information and CSI corresponding to the CSI feedback configuration, specified by the base station, in the set of CSI feedback configurations over a PUCCH; and if it is determined that the indication information of a downlink channel information item to be fed back over a PUCCH is the third indication information, to instruct the transceiver to report positional information and CSI corresponding to each CSI feedback configuration in the set of CSI feedback configurations over a PUCCH.

In an implementation, the processor is configured:

if the configuration information includes the indication information of a downlink channel information item to be fed back over a PUSCH, and if it is determined that the indication information of a downlink channel information item to be fed back over a PUSCH is the first indication information, to instruct the transceiver to report positional information and CSI corresponding to the optimum CSI feedback configuration in the set of CSI feedback configurations over a PUSCH;

if it is determined that the indication information of a downlink channel information item to be fed back over a PUSCH is the second indication information, to instruct the transceiver to report positional information of the optimum CSI feedback configuration in the set of CSI feedback configurations over a PUSCH;

if it is determined that the indication information of a downlink channel information item to be fed back over a PUSCH is the third indication information, to instruct the transceiver to report CSI corresponding to a CSI feedback configuration, corresponding to the latest reported positional information, in the set of CSI feedback configurations over a PUSCH;

if it is determined that the indication information of a downlink channel information item to be fed back over a PUSCH is the fourth indication information, to instruct the transceiver to report CSI corresponding to a CSI feedback configuration, specified by the base station, in the set of CSI feedback configurations over a PUSCH; and if it is determined that the indication information of a downlink channel information item to be fed back over a PUSCH is the fifth indication information, to instruct the transceiver to report CSI corresponding to each CSI feedback configuration in the set of CSI feedback configurations over a PUSCH.

In an implementation, the processor is configured:

if the configuration information includes the codebook indication information, to determine the codebook to be used in calculating CSI during CSI measurement, according to the codebook indication information.

In an implementation, the processor is configured:

to determine a codebook in a set of preset codebooks, an index of which is the codebook indication information, and to take the determined codebook as the codebook to be used in calculating CSI;

or to determine a subset of a preset codebook according to values of respective bits in the codebook indication information, and to take the determined subset as the codebook to be used in calculating CSI, where each bit in the code indication information corresponds to a codeword in the preset codebook;

or to obtain a generation matrix of a target codebook according to the codebook indication information, to determine the target codebook according to the generation matrix and a preset codebook, and to take the target codebook as the codebook to be used in calculating CSI;

or to obtain generation parameters of a target codebook according to the codebook indication information, and to generate the target codebook according to the generation parameters of the codebook, and a preset rule.

In an implementation, the processor is configured:

if the configuration information includes the codebook subset restriction indicator, to determine the codewords currently available in the prescribed codebook according to the codebook subset restriction indicator.

In a sixth aspect, there is provided a base station generally including a processor, a memory, and a transceiver, where the transceiver is configured to be controlled by the processor to receive and transmit data, the memory is configured to store preset program, and the processor is configured to read the program in the memory, and to execute the program:

to transmit a set of Channel State Information (CSI) feedback configurations, and configuration information for feeding back CSI based upon the set of CSI feedback configurations, to a user equipment through the transceiver; and to receive through the transceiver information fed back by the user equipment according to the set of CSI feedback configurations, and the configuration information;

where the set of CSI feedback configurations includes at least one CSI feedback configuration, and the CSI feedback configuration is a downlink signal configuration for measuring and feeding back downlink CSI.

In an implementation, the CSI feedback configuration is a CSI process, a non-zero power CSI measurement resource configuration, or an interference measurement resource configuration. The set of CSI feedback configurations can be any combination of the three CSI feedback configurations above. For example, the set of CSI feedback configurations includes a plurality of non-zero power CSI measurement resource configurations, and one interference measurement resource configuration.

In an implementation, one CSI process corresponds to one non-zero power CSI measurement resource configuration, and one interference measurement resource configuration.

In an implementation, the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

In an implementation, the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

In an implementation, the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to the latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the processor is configured:

to receive through the transceiver the information fed back by the user equipment according to the set of CSI feedback configurations and the configuration information.

In an implementation, the processor is configured:

if the configuration information includes the transmission mode indication information, and the transmission mode indication information indicates the beam-formed CSI measurement pilot transmission mode, to receive through the transceiver positional information and CSI corresponding to the optimum CSI feedback configuration in the set of CSI feedback configurations, reported by the terminal; and if the configuration information includes the transmission mode indication information, and the transmission mode indication information indicates the non-precoded CSI measurement pilot transmission mode, to receive through the transceiver CSI, reported by the terminal, corresponding to each CSI feedback configuration in the set of CSI feedback configurations.

In an implementation, the processor is configured:

if the configuration information includes the CSI feedback mode indication information, to receive through the transceiver CSI, corresponding to each CSI feedback configuration in the set of CSI feedback configurations, reported by the terminal according to the CSI feedback mode indication information, or to receive through the transceiver positional information and CSI corresponding to the optimum CSI feedback configuration in the set of CSI feedback configurations, reported by the terminal according to the CSI feedback mode indication information.

In an implementation, the processor is configured:

if the configuration information includes the indication information of a downlink channel information item to be fed back over a PUCCH, and if the indication information is the first indication information, to receive through the transceiver positional information and CSI corresponding to the optimum CSI feedback configuration in the set of CSI feedback configurations, reported by the terminal over a PUCCH; or if the indication information is the second indication information, to receive through the transceiver positional information and CSI corresponding to the CSI feedback configuration, specified by the base station, in the set of CSI feedback configurations, reported by the terminal over a PUCCH; and if the indication information is the third indication information, to receive through the transceiver positional information and CSI corresponding to each CSI feedback configuration in the set of CSI feedback configurations, reported by the terminal over a PUCCH.

In an implementation, the processor is configured:

if the configuration information includes the indication information of a downlink channel information item to be fed back over a PUSCH, and if the indication information is the first indication information, to receive through the transceiver positional information and CSI corresponding to the optimum CSI feedback configuration in the set of CSI feedback configurations, reported by the terminal over a PUSCH; if the indication information is the second indication information, to receive through the transceiver positional information of the optimum CSI feedback configuration in the set of CSI feedback configurations, reported by the terminal over a PUSCH; if the indication information is the third indication information, to receive through the transceiver CSI corresponding to a CSI feedback configuration, corresponding to the latest reported positional information, in the set of CSI feedback configurations, reported by the terminal over a PUSCH; if the indication information is the fourth indication information, to receive through the transceiver CSI corresponding to a CSI feedback configuration, specified by the base station, in the set of CSI feedback configurations, reported by the terminal over a PUSCH; and if the indication information is the fifth indication information, to receive through the transceiver CSI corresponding to each CSI feedback configuration in the set of CSI feedback configurations, reported by the terminal over a PUSCH.

With the technical solutions above, in the embodiments of the invention, the base station indicates a set of CSI feedback configurations, and configuration information for feeding back CSI based upon the set of CSI feedback configurations, to the terminal, where the set of CSI feedback configurations includes at least one CSI feedback configuration, and the CSI feedback configuration is a downlink signal configuration for measuring and feeding back downlink CSI; and the terminal measures and feeds back CSI according to the set of CSI feedback configurations and the configuration information, so that the terminal can feed back CSI as configured by the base station, and can feed different information items according to the different CSI feedback configurations in the set of CSI feedback configurations, and the different corresponding configuration information. As such, the scenario in which various CSI related information needs to be fed back after the CSI is measured can be supported to thereby improve the flexibility in feeding back the CSI related information.

DETAILED DESCRIPTION OF THE EMBODIMENTS

The technical solutions according to the embodiments of the invention will be described below clearly and fully with reference to the drawings of the invention, and apparently the embodiments described here are only a part but not all of the embodiments of the invention. Based upon the embodiments here of the invention, all the other embodiments which can occur to those ordinarily skilled in the art without any inventive effort shall fall into the scope of the invention as claimed.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS), etc.

It shall be further appreciated that in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN), for example, the user equipment can be a mobile phone (referred to as a "cellular" phone), a computer capable of radio communication, and the user equipment can also be a portable, pocket, handheld, in-computer, on-vehicle mobile device.

In the embodiments of the invention, a base station (e.g., an access point) can refer to a device, in an access network communicating with a radio terminal in one or more sectors via an air interface. The base station can be configured to convert a received air frame into an IP packet, or a received IP packet into an air frame, and to act as a router between the radio terminal, and the remaining part of the access network, where the remaining part of the access network can include an Internet Protocol (IP) network. The base station can further coordinate attribute management on the air interface. For example, the base station can be a Base Transceiver Station (BTS) in the GSM or CDMA system, or can be a Node B in the WCDMA system, or can be an evolved Node B (eNB or e-Node B) in the LTE system, although the embodiments of the invention will not be limited thereto.

Figure 1:
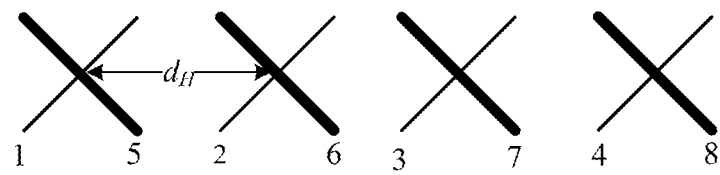
FIG. 1 is a schematic diagram of dual-polarized antennas which are arranged horizontally.
Figure 2:
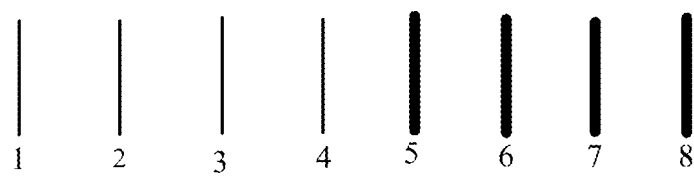
FIG. 2 is a schematic diagram of an array of antennas which are arranged horizontally.
Figure 3:
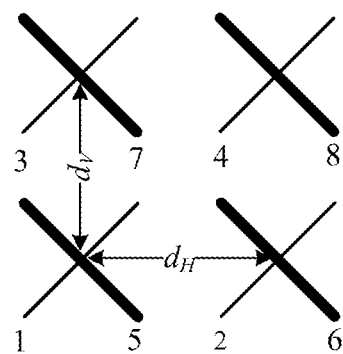
FIG. 3 is a schematic diagram of dual-polarized antennas which are arranged in the horizontal and vertical directions.
Figure 4:
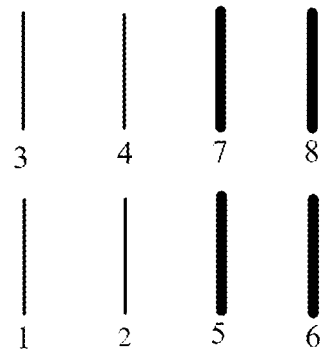
FIG. 4 is a schematic diagram of an array of antennas which are arranged in the horizontal and vertical directions.
Figure 5:
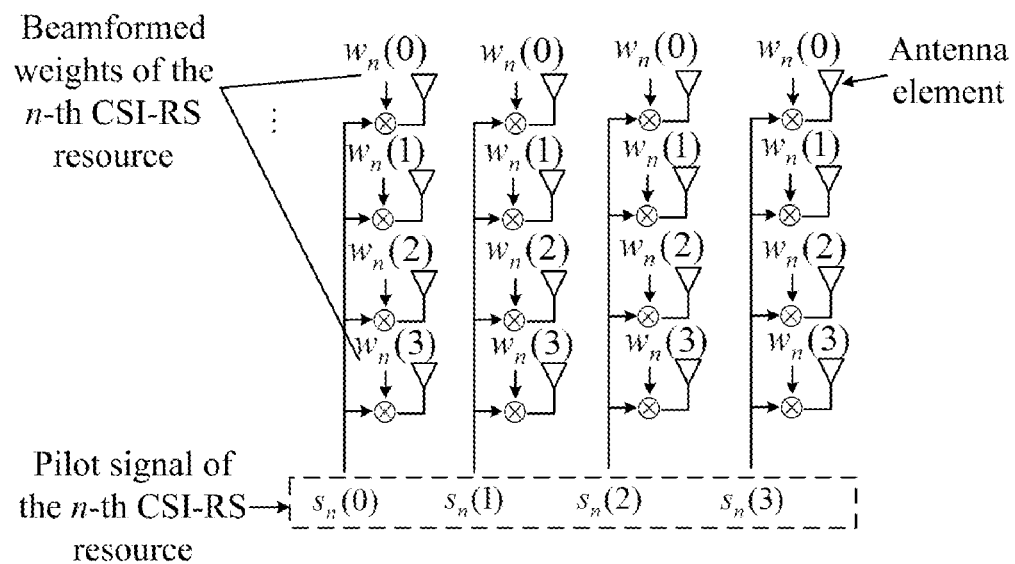
FIG. 5 is a schematic diagram depicting the transmission of a CSI-RS.
Figure 6:
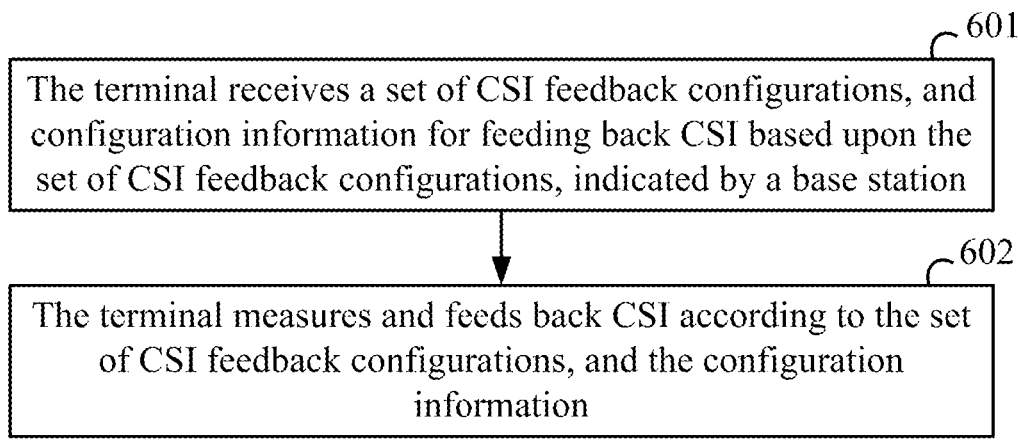
FIG. 6 is a schematic flow chart of a method for feeding back CSI by a terminal according to an embodiment of the invention.

In an embodiment of the invention, as illustrated in FIG. 6, a detailed flow of a method for feeding back CSI by a terminal in an FD MMIMO system is as follows.

In the operation 601, the terminal receives a set of Channel State Information (CSI) feedback configurations, and configuration information for feeding back CSI based upon the set of CSI feedback configurations, indicated by a base station.

Where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration. The set of CSI feedback configurations can be any combination of the three CSI feedback configurations above. For example, the set of CSI feedback configurations includes a plurality of non-zero power CSI measurement resource configurations, and one interference measurement resource configuration.

Where one CSI process corresponds to one non-zero power CSI measurement resource configuration, and one interference measurement resource configuration.

In a particular implementation, the CSI measurement pilot resource configuration in the set of CSI feedback configurations can be indicated by a CSI measurement pilot resource configuration index or identifier. The interference measurement resource configuration in the set of CSI feedback configurations can be indicated by an interference measurement resource configuration index or identifier. The CS process in the set of CSI feedback configurations can be indicated by a CSI process index or identifier.

Where the configuration information can include any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the base station configures the terminal via higher-layer signaling the set of CSI feedback configurations, and the configuration information for feeding back CSI based upon the set of CSI feedback configurations.

In the embodiment of the invention, the positional information of the CSI feedback configuration can be indicated in a number of approaches including but not limited to the following two approaches.

In a first approach, the position information of the CSI feedback configuration is indicated by an index of the CSI feedback configuration in the set of CSI feedback configurations, i.e., an index of the CSI measurement pilot resource among all the CSI measurement pilot resources in the set of CSI feedback configurations, or an index of the CSI process among all the CSI processes in the set of CSI feedback configurations.

In a second approach, the position information of the CSI feedback configuration is indicated by bitmap mapping, that is, all the CSI feedback configurations in the set of CSI feedback configurations correspond to a bit sequence, and each CSI feedback configuration corresponds to a preset number of bits in the bit sequence. For example, each CSI feedback configuration corresponds to one bit in the bit sequence, and if positional information of certain CSI feedback configuration needs to be fed back, then the bit in the bit sequence, which corresponds to the CSI feedback configuration will be set to 1, and the bits in the bit sequence, which correspond to the CSI feedback configurations for which no positional information thereof need to be fed back will be set to 0.

In the operation 602, the terminal measures and feeds back CSI according to the set of CSI feedback configurations, and the configuration information.

In an implementation, the configuration information includes the transmission mode indication information, and the terminal reports CSI based upon the configuration information particularly as follows:

if the terminal determines that the transmission mode indication information indicates the beam-formed CSI measurement pilot transmission mode, then the terminal will report positional information and CSI corresponding to the optimum CSI feedback configuration in the set of CSI feedback configurations; and if the terminal determines that the transmission mode indication information indicates the non-precoded CSI measurement pilot transmission mode, then the terminal will report CSI corresponding to each CSI feedback configuration in the set of CSI feedback configurations.

Where the terminal performs measurement according to each CSI feedback configuration in the set of CSI feedback configurations, and determines the optimum CSI feedback configuration according to measurement results, where the measurement can be CSI measurement, or can be Reference Signal Received Power (RSRP) measurement, etc.

In an implementation, the transmission mode indication information can further indicate the number of CSI feedback configurations. For example, if the transmission mode indication information indicates the beam-formed CSI measurement pilot transmission mode, then the set of CSI feedback configurations indicated by the base station will include four CSI feedback configurations; and if the transmission mode indication information indicates the non-precoded CSI measurement pilot transmission mode, then the set of CSI feedback configurations indicated by the base station will include one CSI feedback configuration.

Particularly if the configuration information includes the transmission mode indication information, then the terminal will determine the number of CSI feedback configurations corresponding to the transmission mode indicated by the transmission mode indication information, and receive indication information of the CSI feedback configuration(s) indicated by the base station according to the number of CSI feedback configurations.

In an implementation, if the configuration information includes the CSI feedback mode indication information, then the terminal reports CSI based upon the configuration information particularly as follows: the terminal reports CSI corresponding to each CSI feedback configuration in the set of CSI feedback configurations according to the CSI feedback mode indication information, or report positional information and CSI corresponding to the optimum CSI feedback configuration in the set of CSI feedback configurations according to the CSI feedback mode indication information.

In an implementation, if the configuration information includes the indication information of a downlink channel information item to be fed back over a PUCCH, then the terminal will report CSI based upon the configuration information particularly as follows:

if the terminal determines that the indication information of a downlink channel information item to be fed back over a PUCCH is the first indication information, then the user equipment will report positional information and CSI corresponding to the optimum CSI feedback configuration in the set of CSI feedback configurations over a PUCCH;

if the terminal determines that the indication information of a downlink channel information item to be fed back over a PUCCH is the second indication information, then the terminal will report positional information and CSI corresponding to the CSI feedback configuration, specified by the base station, in the set of CSI feedback configurations over a PUCCH; and if the terminal determines that the indication information of a downlink channel information item to be fed back over a PUCCH is the third indication information, then the terminal will report positional information and CSI corresponding to each CSI feedback configuration in the set of CSI feedback configurations over a PUCCH.

In an implementation, if the configuration information includes the indication information of a downlink channel information item to be fed back over a PUSCH, then the terminal will report CSI based upon the configuration information particularly as follows:

if the terminal determines that the indication information of a downlink channel information item to be fed back over a PUSCH is the first indication information, then the terminal will report positional information and CSI corresponding to the optimum CSI feedback configuration in the set of CSI feedback configurations over a PUSCH;

if the terminal determines that the indication information of a downlink channel information item to be fed back over a PUSCH is the second indication information, then the terminal will report positional information of the optimum CSI feedback configuration in the set of CSI feedback configurations over a PUSCH;

if the terminal determines that the indication information of a downlink channel information item to be fed back over a PUSCH is the third indication information, then the terminal will report CSI corresponding to a CSI feedback configuration, corresponding to the latest reported positional information, in the set of CSI feedback configurations over a PUSCH;

if the terminal determines that the indication information of a downlink channel information item to be fed back over a PUSCH is the fourth indication information, then the terminal will report CSI corresponding to a CSI feedback configuration, specified by the base station, in the set of CSI feedback configurations over a PUSCH; and if the terminal determines that the indication information of a downlink channel information item to be fed back over a PUSCH is the fifth indication information, then the terminal will report CSI corresponding to each CSI feedback configuration in the set of CSI feedback configurations over a PUSCH.

In an implementation, if the configuration information includes the codebook indication information, then the terminal will determine the codebook to be used in calculating CSI during CSI measurement, according to the codebook indication information.

Particularly the terminal determines the codebook to be used in calculating CSI during CSI measurement, according to the codebook indication information in the following several implementations without any limitation thereto.

In a first implementation, the terminal determines a codebook in a set of preset codebooks, an index of which is the codebook indication information, and takes the determined codebook as the codebook to be used in calculating CSI. For example, the base station pre-configures the terminal with four codebooks, and indicates an index of a target codebook among the four codebooks using codebook indication information with the length of 2 bits.

In a second implementation, the terminal determines a subset of a preset codebook according to the values of respective bits in the codebook indication information, and takes the determined subset as the codebook to be used in calculating CSI, where each bit in the code indication information corresponds to a codeword in the preset codebook. For example, the codebook indication information is embodied in a bitmap, that is, the codebook indication information is a bit sequence, each bit in the bit sequence corresponds to a codeword in the preset codebook, a bit of with the value of "1" in the bit sequence represents that a corresponding codeword is available, and the codebook to be used in calculating CSI is obtained according to all the bits of with the value of "1" in the bit sequence.

In a third implementation, the terminal obtains a generation matrix of a target codebook according to the codebook indication information, determines the target codebook according to the generation matrix and a preset codebook, and takes the target codebook as the codebook to be used in calculating CSI.

In a fourth implementation, the terminal obtains generation parameters of a target codebook according to the codebook indication information, and generates the target codebook according to the generation parameters of the codebook and a preset rule, where the generation parameters of the target codebook can include the numbers of beams in the horizontal and vertical directions in the target codebook, an over-sampling rate of the codebook, etc.

In an implementation, if the configuration information includes the codebook subset restriction indicator, then the terminal will determine the codewords currently available in the prescribed codebook according to the codebook subset restriction indicator.

Particularly the codebook subset restriction indicator is embodied in a bitmap, that is, the codebook subset restriction indicator is a bit sequence, each bit in the bit sequence corresponds to a codeword to the prescribed codebook, and a bit of with the value of "1" represents that a corresponding codeword is currently available in the prescribed codebook.

Particularly the codebook subset restriction indicator can be used in combination with the codebook indication information, that is, the codebook currently for use is determined according to the codebook indication information, and the codewords currently available in the codebook currently for use are determined according to the codebook subset restriction indicator.

Figure 7:
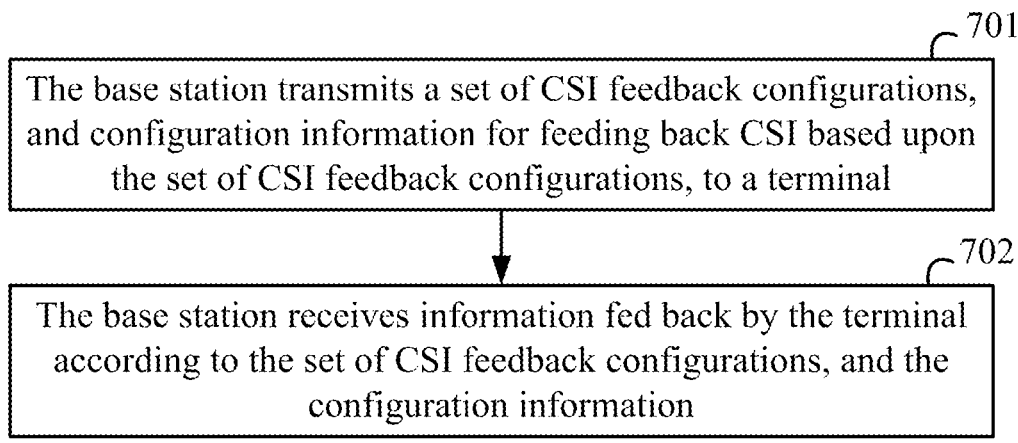
FIG. 7 is a schematic flow chart of a method for obtaining CSI by a base station according to an embodiment of the invention.

Based upon the same inventive idea, as illustrated in FIG. 7, a flow of a method for obtaining channel state information by a base station in an FD MIMO system is as follows.

In the operation 701, the base station transmits a set of Channel State Information (CSI) feedback configurations, and configuration information for feeding back CSI based upon the set of CSI feedback configurations, to a terminal.

Where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration. The set of CSI feedback configurations can be any combination of the three CSI feedback configurations above. For example, the set of CSI feedback configurations includes a plurality of non-zero power CSI measurement resource configurations, and one interference measurement resource configuration.

Where one CSI process corresponds to one non-zero power CSI measurement resource configuration, and one interference measurement resource configuration.

Where the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In the step 702, the base station receives information fed back by the terminal according to the set of CSI feedback configurations, and the configuration information.

Where the base station can receive the information fed back by the terminal according to the set of CSI feedback configurations, and the configuration information particularly as described for the reporting by the terminal according to the set of CSI feedback configurations, and the configuration information.

Particularly if the configuration information includes the transmission mode indication information, and the transmission mode indication information indicates the beam-formed CSI measurement pilot transmission mode, then the base station will receive positional information and CSI corresponding to the optimum CSI feedback configuration in the set of CSI feedback configurations, reported by the terminal.

If the configuration information includes the transmission mode indication information, and the transmission mode indication information indicates the non-precoded CSI measurement pilot transmission mode, then the base station will receive CSI, reported by the terminal, corresponding to each CSI feedback configuration in the set of CSI feedback configurations.

Particularly if the configuration information includes the CSI feedback mode indication information, then the base station will receive CSI, corresponding to each CSI feedback configuration in the set of CSI feedback configurations, reported by the terminal according to the CSI feedback mode indication information, or receive positional information and CSI corresponding to the optimum CSI feedback configuration in the set of CSI feedback configurations, reported by the terminal according to the CSI feedback mode indication information.

In an implementation, if the configuration information includes the indication information of a downlink channel information item to be fed back over a PUCCH, then if the indication information is the first indication information, then the base station will receive positional information and CSI corresponding to the optimum CSI feedback configuration in the set of CSI feedback configurations, reported by the terminal over a PUCCH; if the indication information is the second indication information, then the base station will receive positional information and CSI corresponding to the CSI feedback configuration, specified by the base station, in the set of CSI feedback configurations, reported by the terminal over a PUCCH; and if the indication information is the third indication information, then the base station will receive positional information and CSI corresponding to each CSI feedback configuration in the set of CSI feedback configurations, reported by the terminal over a PUCCH.

Particularly if the configuration information includes the indication information of a downlink channel information item to be fed back over a PUSCH, then if the indication information is the first indication information, then the base station will receive positional information and CSI corresponding to the optimum CSI feedback configuration in the set of CSI feedback configurations, reported by the terminal over a PUSCH; if the indication information is the second indication information, then the base station will receive positional information of the optimum CSI feedback configuration in the set of CSI feedback configurations, reported by the terminal over a PUSCH; if the indication information is the third indication information, then the base station will receive CSI corresponding to a CSI feedback configuration, corresponding to the latest reported positional information, in the set of CSI feedback configurations, reported by the terminal over a PUSCH; if the indication information is the fourth indication information, then the base station will receive CSI corresponding to a CSI feedback configuration, specified by the base station, in the set of CSI feedback configurations, reported by the terminal over a PUSCH; and if the indication information is the fifth indication information, then the base station will receive CSI corresponding to each CSI feedback configuration in the set of CSI feedback configurations, reported by the user equipment over a PUSCH.

A method for feeding back channel state information in an FD MIMO system will be described below in two particular embodiments thereof by way of an example.

In a first particular embodiment, a base station configures a UE with a set of CSI feedback configurations via higher-layer signaling, and the set of CSI feedback configurations includes:

a CSI measurement pilot resource configuration index with the length of 4 bits, which is configured to indicate a CSI measurement pilot resource configuration; and an interference measurement resource configuration index with the length of 4 bits, which is configured to indicate an interference measurement resource configuration.

Furthermore the base station configures via higher-layer signaling the UE with configuration information for feeding back CSI based upon the configured set of CSI feedback configurations, and the configuration information includes:

CSI feedback mode indication information with the length of 1 bit, which is configured to indicate that the CSI feedback mode is to feed back only CSI, or to feed back positional information and CSI corresponding to a CSI feedback configuration, where in this particular embodiment, for example, the CSI feedback mode indication information indicates only CSI to be fed back;

codebook indication information with the length of 2 bits, which is configured to indicate an index of a codebook currently in use for feedback among four codebooks pre-configured by the base station, where the base station pre-configures respective generation matrixes of the four codebooks to generate the four codebooks, and the largest codebook size among all the codebooks is 64 bits; and codebook subset restriction indication information with the length of 64 bits, which is configured to indicate available codewords in the codebook, where each bit corresponds to a codeword in the codebook.

The UE performs CSI measurement and reporting according to the set of CSI feedback configurations, and the configuration information for feeding back CSI based upon the set of CSI feedback configurations, particularly as follows:

in the first step, the UE determines the CSI measurement pilot resource configuration based upon the CSI measurement pilot resource configuration index, determines the interference measurement resource configuration based upon the interference measurement resource configuration index, and measures CSI according to the CSI measurement pilot resource configuration, and the interference measurement resource configuration;

in the second step, the UE determines according to the CSI feedback mode indication information in the configuration information that, the CSI corresponding to each CSI measurement pilot resource configuration in the set of CSI feedback configurations is to be fed back;

in the third step, the UE determines the codebook to be used in calculating CSI, based upon the codebook indication information, determines the available codewords in the codebook based upon the codebook subset restriction indicator, and estimates CSI based upon the determined available codewords; and in the fourth step, the UE reports the measured CSI corresponding to each CSI measurement pilot resource configuration in the set of CSI feedback configurations.

In a second particular embodiment, a base station configures a UE with a set of CSI feedback configurations via higher-layer signaling, and the set of CSI feedback configurations includes:

four CSI measurement pilot resource configuration indexes each with the length of 4 bits, which are configured to indicate four CSI measurement pilot resource configurations; and an interference measurement resource configuration index with the length of 4 bits, which is configured to indicate an interference measurement resource configuration.

Furthermore the base station configures via higher-layer signaling the UE with configuration information for feeding back CSI based upon the configured set of CSI feedback configurations, and the configuration information includes:

indication information, with the length of 1 bit, of a downlink channel information item to be fed back over a PUCCH, where the downlink channel information item is indicated particularly as depicted in Table 1, and if the value of the indication information of a downlink channel information item to be fed back over a PUCCH is 1, then the base station will further indicate index information of a specified CSI measurement pilot resource among all the CSI measurement pilot resources to the UE, where the index information is used for the UE to determine the CSI measurement pilot resource specified by the base station;

TABLE 1

| Information field | Indicated item |
| --- | --- |
| 0 | To feed back CSI and positional information of the optimum CSI-RS resource in the set of CSI feedback configurations |
| 1 | To feed back CSI of a CSI-RS resource specified by the base station in the set of CSI feedback configurations | indication information, with the length of 2 bits, of a downlink channel information item to be fed back over a PUSCH, where the downlink channel information item is indicated particularly as depicted in Table 2;

TABLE 2

| Information field | Indicated item |
| --- | --- |
| 00 | To feed back CSI and index of the optimum CSI-RS resource in the set of CSI feedback configurations |
| 01 | To feed back positional information of the optimum CSI-RS resource in the set of CSI feedback configurations |
| 10 | To feed back CSI corresponding to a CSI-RS resource, corresponding to the latest reported positional information, in the set of CSI feedback configurations |
| 11 | To feed back CSI of a CSI-RS resource specified by the base station in the set of CSI feedback configurations | codebook indication information with the length of 3 bits, which is configured to indicate an index of a generation matrix currently used for the current codebook, among all the pre-configured generation matrixes.

The UE performs CSI measurement and reporting according to the set of CSI feedback configurations, and the configuration information for feeding back CSI based upon the set of CSI feedback configurations, particularly as follows:

in the first step, the UE determines positional information and CSI corresponding to the optimum CSI measurement pilot resource configuration in the set of CSI feedback configurations, based upon the indication information of a downlink channel information item to be fed back over a PUSCH;

in the second step, the UE determines the four CSI measurement pilot resource configurations based upon the four CSI measurement pilot resource configuration indexes in the set of CSI feedback configurations, determines the interference measurement resource configuration based upon the interference measurement resource configuration index, measures RSRP respectively according to the respective CSI measurement pilot resource configurations, and determines the CSI measurement pilot resource configuration with the highest RSRP as the optimum CSI measurement pilot resource configuration;

in the third step, the UE determines the generation matrix of the codebook based upon the codebook indication information, and generates the codebook based upon a predefined codebook generation scheme, and the generation matrix;

in the fourth step, the UE performs CSI measurement based upon the optimum CSI measurement pilot resource configuration, and the interference measurement resource configurations, where the CSI measurement is performed using the codebook generated in the third step; and in the fifth step, the UE feeds back periodically the index of the optimum CSI measurement pilot resource configuration among all the CSI measurement pilot resource configurations, and the measured CSI.

If the UE receives aperiodical CSI trigger signaling from the base station, then the UE will measure and aperiodically feed back CSI based upon the set of CSI feedback configurations, and the configuration information for feeding back CSI based upon the set of CSI feedback configurations particularly as follows:

in the first step, the UE determines CSI corresponding to a CSI pilot resource configuration, specified by the base station, in the set of CSI feedback configurations, based upon the indication information of a downlink channel information item to be fed back over a PUSCH;

in the second step, the UE determines the CSI measurement pilot resource configuration specified by the base station, from the four CSI measurement pilot resource configurations in the set of CSI feedback configurations, according to the CSI pilot resource configuration indication information with the length of 2 bits carried in the aperiodical CSI trigger signaling;

in the third step, the UE determines the generation matrix of the codebook based upon the codebook indication information, and generates the codebook based upon a predefined codebook generation scheme, and the generation matrix;

in the fourth step, the UE performs CSI measurement based upon the CSI measurement pilot resource configuration specified by the base station, and the interference measurement resource configuration in the set of CSI feedback configurations, where the CSI measurement is performed using the codebook generated in the third step; and in the fifth step, the UE reports the measured CSI to the base station.

Figure 8:
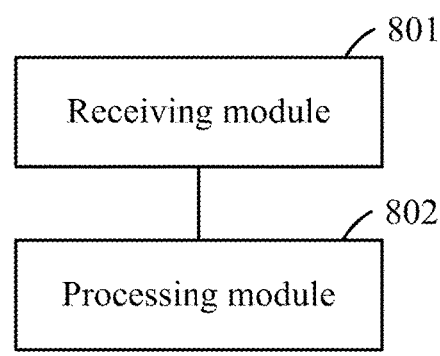
FIG. 8 is a schematic structural diagram of a terminal according to an embodiment of the invention.

Based upon the same inventive idea, an embodiment of the invention further provides a terminal, and reference can be made to the description of the embodiment of the method above for a particular implementation of the terminal, so a repeated description thereof will be omitted here; and as illustrated in FIG. 8, the user equipment generally includes:

a receiving module 801 is configured to receive a set of Channel State Information (CSI) feedback configurations, and configuration information for feeding back CSI based upon the set of CSI feedback configurations, indicated by a base station; and a processing module 802 is configured to measure and feed back CSI according to the set of CSI feedback configurations, and the configuration information;

where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration.

Where the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the processing module is configured:

if the configuration information includes the transmission mode indication information, and it is determined that the transmission mode indication information indicates the beam-formed CSI measurement pilot transmission mode, to report positional information and CSI corresponding to the optimum CSI feedback configuration in the set of CSI feedback configurations; and if the configuration information includes the transmission mode indication information, and it is determined that the transmission mode indication information indicates the non-precoded CSI measurement pilot transmission mode, to report CSI corresponding to each CSI feedback configuration in the set of CSI feedback configurations.

In an implementation, the transmission mode indication information further indicates the number of CSI feedback configurations in the set of CSI feedback configurations configured by the base station, and the receiving module is configured:

if the configuration information includes the transmission mode indication information, to determine the number of CSI feedback configurations corresponding to the transmission mode indicated by the transmission mode indication information, and to receive indication information of the CSI feedback configuration(s) indicated by the base station according to the number of CSI feedback configurations.

In an implementation, the processing module is configured:

if the configuration information includes the CSI feedback mode indication information, to report CSI corresponding to each CSI feedback configuration according to the CSI feedback mode indication information, or to report positional information and CSI corresponding to the optimum CSI feedback configuration according to the CSI feedback mode indication information.

In an implementation, the processing module is configured:

if the configuration information includes the indication information of a downlink channel information item to be fed back over a PUCCH, and if it is determined that the indication information of a downlink channel information item to be fed back over a PUCCH is the first indication information, to report positional information and CSI corresponding to the optimum CSI feedback configuration in the set of CSI feedback configurations over a PUCCH;

if it is determined that the indication information of a downlink channel information item to be fed back over a PUCCH is the second indication information, to report positional information and CSI corresponding to the CSI feedback configuration, specified by the base station, in the set of CSI feedback configurations over a PUCCH; and if it is determined that the indication information of a downlink channel information item to be fed back over a PUCCH is the third indication information, to report positional information and CSI corresponding to each CSI feedback configuration in the set of CSI feedback configurations over a PUCCH.

In an implementation, the processing module is configured:

if the configuration information includes the indication information of a downlink channel information item to be fed back over a PUSCH, and if it is determined that the indication information of a downlink channel information item to be fed back over a PUSCH is the first indication information, to report positional information and CSI corresponding to the optimum CSI feedback configuration in the set of CSI feedback configurations over a PUSCH;

if it is determined that the indication information of a downlink channel information item to be fed back over a PUSCH is the second indication information, to report positional information of the optimum CSI feedback configuration in the set of CSI feedback configurations over a PUSCH;

if it is determined that the indication information of a downlink channel information item to be fed back over a PUSCH is the third indication information, to report CSI corresponding to a CSI feedback configuration, corresponding to the latest reported positional information, in the set of CSI feedback configurations over a PUSCH;

if it is determined that the indication information of a downlink channel information item to be fed back over a PUSCH is the fourth indication information, to report CSI corresponding to a CSI feedback configuration, specified by the base station, in the set of CSI feedback configurations over a PUSCH; and if it is determined that the indication information of a downlink channel information item to be fed back over a PUSCH is the fifth indication information, to report CSI corresponding to each CSI feedback configuration in the set of CSI feedback configurations over a PUSCH.

In an implementation, the processing module is configured:

if the configuration information includes the codebook indication information, to determine the codebook to be used in calculating CSI during CSI measurement, according to the codebook indication information.

Particularly the processing module is configured:

to determine a codebook in a set of preset codebooks, an index of which is the codebook indication information, and to take the determined codebook as the codebook to be used in calculating CSI;

or to determine a subset of a preset codebook according to values of respective bits in the codebook indication information, and to take the determined subset as the codebook to be used in calculating CSI, where each bit in the code indication information corresponds to a codeword in the preset codebook;

or to obtain a generation matrix of a target codebook according to the codebook indication information, to determine the target codebook according to the generation matrix and a preset codebook, and to take the target codebook as the codebook to be used in calculating CSI;

or to obtain generation parameters of a target codebook according to the codebook indication information, and to generate the target codebook according to the generation parameters of the codebook and a preset rule.

In an implementation, the processing module is configured:

if the configuration information includes the codebook subset restriction indicator, to determine the codewords currently available in the prescribed codebook according to the codebook subset restriction indicator.

Figure 9:
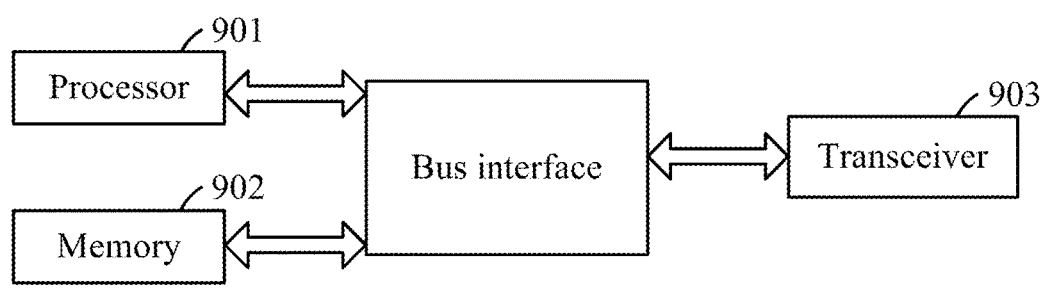
FIG. 9 is a schematic structural diagram of a terminal according to another embodiment of the invention.

Based upon the same inventive idea, an embodiment of the invention further provides a terminal, and reference can be made to the description of the method of the embodiment above for a particular implementation of the terminal, so a repeated description thereof will be omitted here; and as illustrated in FIG. 9, the terminal generally includes a processor 901, a memory 902, and a transceiver 903, where the transceiver is configured to be controlled by the processor to receive and transmit data, the memory is configured to store preset program, and the processor is configured to read the program in the memory, and to execute the program:

to receive a set of Channel State Information (CSI) feedback configurations, and configuration information for feeding back CSI based upon the set of CSI feedback configurations, indicated by a base station through the transceiver 903; and to measure and feed back CSI according to the set of CSI feedback configurations, and the configuration information;

where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration.

Where the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, if the configuration information includes the transmission mode indication information, then if determining that the transmission mode indication information indicates the beam-formed CSI measurement pilot transmission mode, the processor will report positional information and CSI corresponding to the optimum CSI feedback configuration in the set of CSI feedback configurations; and if determining that the transmission mode indication information indicates the non-precoded CSI measurement pilot transmission mode, then the processor will report CSI corresponding to each CSI feedback configuration in the set of CSI feedback configurations.

In an implementation, the transmission mode indication information further indicates the number of CSI feedback configurations in the set of CSI feedback configurations configured by the base station, and if the configuration information includes the transmission mode indication information, then the processor will determine the number of CSI feedback configurations corresponding to the transmission mode indicated by the transmission mode indication information, and instruct the transceiver to receive indication information of the CSI feedback configuration(s) indicated by the base station according to the number of CSI feedback configurations.

If the configuration information includes the CSI feedback mode indication information, then the processor will report CSI corresponding to each CSI feedback configuration through the transceiver according to the CSI feedback mode indication information, or report positional information and CSI corresponding to the optimum CSI feedback configuration through the transceiver according to the CSI feedback mode indication information.

In an implementation, if the configuration information includes the indication information of a downlink channel information item to be fed back over a PUCCH, then if it is determined that the indication information of a downlink channel information item to be fed back over a PUCCH is the first indication information, then the processor will instruct the transceiver to report positional information and CSI corresponding to the optimum CSI feedback configuration in the set of CSI feedback configurations over a PUCCH;

if it is determined that the indication information of a downlink channel information item to be fed back over a PUCCH is the second indication information, then the processor will instruct the transceiver to report positional information and CSI corresponding to the CSI feedback configuration, specified by the base station, in the set of CSI feedback configurations over a PUCCH; and if it is determined that the indication information of a downlink channel information item to be fed back over a PUCCH is the third indication information, then the processor will instruct the transceiver to report positional information and CSI corresponding to each CSI feedback configuration in the set of CSI feedback configurations over a PUCCH.

In an implementation, if the configuration information includes the indication information of a downlink channel information item to be fed back over a PUSCH, then if it is determined that the indication information of a downlink channel information item to be fed back over a PUSCH is the first indication information, then the processor will instruct the transceiver to report positional information and CSI corresponding to the optimum CSI feedback configuration in the set of CSI feedback configurations over a PUSCH;

if it is determined that the indication information of a downlink channel information item to be fed back over a PUSCH is the second indication information, then the processor will instruct the transceiver to report positional information of the optimum CSI feedback configuration in the set of CSI feedback configurations over a PUSCH;

if it is determined that the indication information of a downlink channel information item to be fed back over a PUSCH is the third indication information, then the processor will instruct the transceiver to report CSI corresponding to a CSI feedback configuration, corresponding to the latest reported positional information, in the set of CSI feedback configurations over a PUSCH;

if it is determined that the indication information of a downlink channel information item to be fed back over a PUSCH is the fourth indication information, then the processor will instruct the transceiver to report CSI corresponding to a CSI feedback configuration, specified by the base station, in the set of CSI feedback configurations over a PUSCH; and if it is determined that the indication information of a downlink channel information item to be fed back over a PUSCH is the fifth indication information, then the processor will instruct the transceiver to report CSI corresponding to each CSI feedback configuration in the set of CSI feedback configurations over a PUSCH.

In an implementation, if the configuration information includes the codebook indication information, then the processor will determine the codebook to be used in calculating CSI during CSI measurement, according to the codebook indication information.

Particularly the processor is configured to determine a codebook in a set of preset codebooks, an index of which is the codebook indication information, and to take the determined codebook as the codebook to be used in calculating CSI;

or the processor is configured to determine a subset of a preset codebook according to values of respective bits in the codebook indication information, and to take the determined subset as the codebook to be used in calculating CSI, where each bit in the code indication information corresponds to a codeword in the preset codebook;

or the processor is configured to obtain a generation matrix of a target codebook according to the codebook indication information, to determine the target codebook according to the generation matrix and a preset codebook, and to take the target codebook as the codebook to be used in calculating CSI;

or the processor is configured to obtain generation parameters of a target codebook according to the codebook indication information, and to generate the target codebook according to the generation parameters of the codebook, and a preset rule.

In an implementation, if the configuration information includes the codebook subset restriction indicator, then the processor will determine the codewords currently available in the prescribed codebook according to the codebook subset restriction indicator.

Here the bus architecture can include any number of interconnecting buses and bridges to particularly link together various circuits including one or more processors represented by the processor, and one or more memories represented by the memory. The bus architecture can further link together various other circuits, e.g., prophetical devices, voltage regulators, power management circuits, etc., all of which are well known in the art, so a further description thereof will be omitted in this context. The bus interface serves as an interface between the bus and the transceiver.

The transceiver can be a number of elements including a transmitters and a receiver, which provide units for communication with various other devices over a transmission medium. The processor is responsible for managing the bus architecture and performing normal processes, and the memory can store data for use by the processor in performing the operations.

Figure 10:
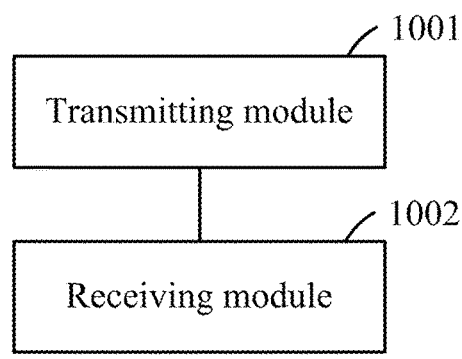
FIG. 10 is a schematic structural diagram of a base station according to an embodiment of the invention.

Based upon the same inventive idea, an embodiment of the invention further provides a base station, and reference can be made to the description of the embodiment of the method above for a particular implementation of the base station, so a repeated description thereof will be omitted here; and as illustrated in FIG. 10, the base station includes:

a transmitting module 1001, which is configured to transmit a set of Channel State Information (CSI) feedback configurations, and configuration information for feeding back CSI based upon the set of CSI feedback configurations, to a terminal; and a receiving module 1002, which is configured to receive information fed back by the terminal according to the set of CSI feedback configurations, and the configuration information;

where the set of CSI feedback configurations includes at least one CSI feedback configuration, and the CSI feedback configuration is a downlink signal configuration for measuring and feeding back downlink CSI.

Where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration. The set of CSI feedback configurations can be any combination of the three CSI feedback configurations above. For example, the set of CSI feedback configurations includes a plurality of non-zero power CSI measurement resource configurations, and one interference measurement resource configuration.

Where one CSI process corresponds to one non-zero power CSI measurement resource configuration, and one interference measurement resource configuration.

Where the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the receiving module can receive the information fed back by the terminal according to the set of CSI feedback configurations, and the configuration information particularly as described for the reporting by the terminal according to the set of CSI feedback configurations, and the configuration information.

Particularly if the configuration information includes the transmission mode indication information, and the transmission mode indication information indicates the beam-formed CSI measurement pilot transmission mode, then the receiving module will receive positional information and CSI corresponding to the optimum CSI feedback configuration in the set of CSI feedback configurations, reported by the terminal.

If the configuration information includes the transmission mode indication information, and the transmission mode indication information indicates the non-precoded CSI measurement pilot transmission mode, then the receiving module will receive CSI, reported by the terminal, corresponding to each CSI feedback configuration in the set of CSI feedback configurations.

Particularly if the configuration information includes the CSI feedback mode indication information, then the receiving module will receive CSI, corresponding to each CSI feedback configuration in the set of CSI feedback configurations, reported by the terminal according to the CSI feedback mode indication information, or the receiving module will receive positional information and CSI corresponding to the optimum CSI feedback configuration in the set of CSI feedback configurations, reported by the terminal according to the CSI feedback mode indication information.

In an implementation, if the configuration information includes the indication information of a downlink channel information item to be fed back over a PUCCH, then if the indication information is the first indication information, then the receiving module will receive positional information and CSI corresponding to the optimum CSI feedback configuration in the set of CSI feedback configurations, reported by the terminal over a PUCCH; or if the indication information is the second indication information, then the receiving module will receive positional information and CSI corresponding to the CSI feedback configuration, specified by the base station, in the set of CSI feedback configurations, reported by the terminal over a PUCCH; and if the indication information is the third indication information, then the receiving module will receive positional information and CSI corresponding to each CSI feedback configuration in the set of CSI feedback configurations, reported by the terminal over a PUCCH.

Particularly if the configuration information includes the indication information of a downlink channel information item to be fed back over a PUSCH, then if the indication information is the first indication information, then the receiving module will receive positional information and CSI corresponding to the optimum CSI feedback configuration in the set of CSI feedback configurations, reported by the terminal over a PUSCH; if the indication information is the second indication information, then the receiving module will receive positional information of the optimum CSI feedback configuration in the set of CSI feedback configurations, reported by the terminal over a PUSCH; if the indication information is the third indication information, then the receiving module will receive CSI corresponding to a CSI feedback configuration, corresponding to the latest reported positional information, in the set of CSI feedback configurations, reported by the terminal over a PUSCH; if the indication information is the fourth indication information, then the receiving module will receive CSI corresponding to a CSI feedback configuration, specified by the base station, in the set of CSI feedback configurations, reported by the terminal over a PUSCH; and if the indication information is the fifth indication information, then the receiving module will receive CSI corresponding to each CSI feedback configuration in the set of CSI feedback configurations, reported by the terminal over a PUSCH.

Figure 11:
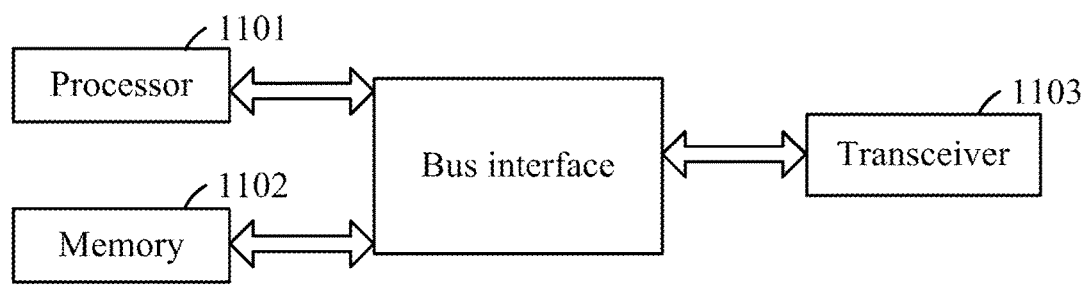
FIG. 11 is a schematic structural diagram of a base station according to another embodiment of the invention.

Based upon the same inventive idea, an embodiment of the invention further provides a base station, and reference can be made to the description of the method of the embodiment above for a particular implementation of the base station, so a repeated description thereof will be omitted here; and as illustrated in FIG. 11, the base station generally includes a processor 1101, a memory 1102, and a transceiver 1103, where the transceiver is configured to be controlled by the processor to receive and transmit data, the memory is configured to store preset program, and the processor is configured to read the program in the memory, and to execute the program:

to transmit a set of Channel State Information (CSI) feedback configurations, and configuration information for feeding back CSI based upon the set of CSI feedback configurations, to a terminal through the transceiver; and to receive through the transceiver information fed back by the terminal according to the set of CSI feedback configurations, and the configuration information;

where the set of CSI feedback configurations includes at least one CSI feedback configuration, and the CSI feedback configuration is a downlink signal configuration for measuring and feeding back downlink CSI.

Where the set of CSI feedback configurations includes at least one CSI feedback configuration, and the CSI feedback configuration is a downlink signal configuration for measuring and feeding back downlink CSI.

Where the CSI feedback configuration is a CSI process, a non-zero power CSI measurement resource configuration, or an interference measurement resource configuration. The set of CSI feedback configurations can be any combination of the three CSI feedback configurations above. For example, the set of CSI feedback configurations includes a plurality of non-zero power CSI measurement resource configurations, and one interference measurement resource configuration.

Where one CSI process corresponds to one non-zero power CSI measurement resource configuration, and one interference measurement resource configuration.

Where the configuration information includes any one or more of:

transmission mode indication information, where the transmission mode is a beam-formed CSI measurement pilot transmission mode, or a non-precoded CSI measurement pilot transmission mode;

CSI feedback mode indication information, where the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Control Channel (PUCCH);

indication information of a downlink channel information item to be fed back over a Physical Uplink Shared Channel (PUSCH);

codebook indication information of a codebook to be used in calculating CSI; and a codebook subset restriction indicator indicating codewords available in a predefined codebook to be used in calculating CSI.

Where the indication information of a downlink channel information item to be fed back over a PUCCH is:

first indication information to be fed back over a PUCCH, which is composed of positional information and CSI corresponding to the optimum CSI feedback configuration in the set of CSI feedback configurations; or second indication information to be fed back over a PUCCH, which is composed of positional information and CSI corresponding to a CSI feedback configuration, specified by the base station, in the set of CSI feedback configurations; or third indication information to be fed back over a PUCCH, which is composed of positional information and CSI corresponding to each CSI feedback configuration in the set of CSI feedback configurations.

Where the indication information of a downlink channel information item to be fed back over a PUSCH is:

first indication information to be fed back over a PUSCH, which is composed of positional information of, and CSI corresponding to the optimum CSI feedback configuration in the set of CSI feedback configurations; or second indication information to be fed back over a PUSCH, which is composed of positional information of the optimum CSI feedback configuration in the set of CSI feedback configurations; or third indication information to be fed back over a PUSCH, which is composed of CSI corresponding to a CSI feedback configuration, corresponding to latest reported positional information, in the set of CSI feedback configurations; or fourth indication information to be fed back over a PUSCH, which is composed of CSI corresponding to a CSI feedback configuration, specified by the base station, in the set of CSI feedback configurations; or fifth indication information to be fed back over a PUSCH, which is composed of CSI corresponding to each CSI feedback configuration in the set of CSI feedback configurations.

In an implementation, the processor can receive the information fed back by the terminal according to the set of CSI feedback configurations, and the configuration information through the transceiver particularly as described for the reporting by the terminal according to the set of CSI feedback configurations, and the configuration information.

Particularly if the configuration information includes the transmission mode indication information, and the transmission mode indication information indicates the beam-formed CSI measurement pilot transmission mode, then the processor will receive through the transceiver positional information and CSI corresponding to the optimum CSI feedback configuration in the set of CSI feedback configurations, reported by the terminal.

If the configuration information includes the transmission mode indication information, and the transmission mode indication information indicates the non-precoded CSI measurement pilot transmission mode, then the processor will receive through the transceiver CSI, reported by the terminal, corresponding to each CSI feedback configuration in the set of CSI feedback configurations.

Particularly if the configuration information includes the CSI feedback mode indication information, then the processor will receive CSI through the transceiver, corresponding to each CSI feedback configuration in the set of CSI feedback configurations, reported by the terminal according to the CSI feedback mode indication information, or the processor will receive positional information and CSI corresponding to the optimum CSI feedback configuration in the set of CSI feedback configurations, reported by the terminal according to the CSI feedback mode indication information through the transceiver.

In an implementation, if the configuration information includes the indication information of a downlink channel information item to be fed back over a PUCCH, then if the indication information is the first indication information, then the processor will receive through the transceiver positional information and CSI corresponding to the optimum CSI feedback configuration in the set of CSI feedback configurations, reported by the terminal over a PUCCH; if the indication information is the second indication information, then the processor will receive through the transceiver positional information and CSI corresponding to the CSI feedback configuration, specified by the base station, in the set of CSI feedback configurations, reported by the terminal over a PUCCH; and if the indication information is the third indication information, then the processor will receive through the transceiver positional information and CSI corresponding to each CSI feedback configuration in the set of CSI feedback configurations, reported by the terminal over a PUCCH.

Particularly if the configuration information includes the indication information of a downlink channel information item to be fed back over a PUSCH, then if the indication information is the first indication information, then the processor will receive through the transceiver positional information and CSI corresponding to the optimum CSI feedback configuration in the set of CSI feedback configurations, reported by the terminal over a PUSCH; if the indication information is the second indication information, then the processor will receive through the transceiver positional information of the optimum CSI feedback configuration in the set of CSI feedback configurations, reported by the terminal over a PUSCH; if the indication information is the third indication information, then the processor will receive through the transceiver CSI corresponding to a CSI feedback configuration, corresponding to the latest reported positional information, in the set of CSI feedback configurations, reported by the terminal over a PUSCH; if the indication information is the fourth indication information, then the processor will receive through the transceiver CSI corresponding to a CSI feedback configuration, specified by the base station, in the set of CSI feedback configurations, reported by the terminal over a PUSCH; and if the indication information is the fifth indication information, then the processor will receive through the transceiver CSI corresponding to each CSI feedback configuration in the set of CSI feedback configurations, reported by the terminal over a PUSCH.

Here the bus architecture can include any number of interconnecting buses and bridges to particularly link together various circuits including one or more processors represented by the processor, and one or more memories represented by the memory. The bus architecture can further link together various other circuits, e.g., prophetical devices, voltage regulators, power management circuits, etc., all of which are well known in the art, so a further description thereof will be omitted in this context. The bus interface serves as an interface between the bus and the transceiver. The transceiver can be a number of elements including a transmitters and a receiver, which provide units for communication with various other devices over a transmission medium. The processor is responsible for managing the bus architecture and performing normal processes, and the memory can store data for use by the processor in performing the operations.

Based upon the technical solutions above, in the embodiments of the invention, the base station indicates a set of CSI feedback configurations, and configuration information for feeding back CSI based upon the set of CSI feedback configurations, to the terminal, where the set of CSI feedback configurations includes at least one CSI feedback configuration, and the CSI feedback configuration is a downlink signal configuration for measuring and feeding back downlink CSI; and the terminal measures and feeds back CSI according to the set of CSI feedback configurations, and the configuration information, so that the terminal can feed back CSI as configured by the base station, and can feed back different information items according to the different CSI feedback configurations in the set of CSI feedback configurations, and the different corresponding configuration information. As such, the scenario in which various CSI related information needs to be fed back after the CSI is measured can be supported to thereby improve the flexibility in feeding back the CSI related information. For example, CSI feedback in the beamformed CSI-RS transmission mode, and in the non-precoded CSI-RS transmission mode can be supported using the configuration information.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer usable storage mediums (including but not limited to a disk memory, a CD-ROM, an optical memory, etc.) in which computer usable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for feeding back channel state information in a Full-Dimension, FD, Multiple input Multiple Output, MIMO, system, the method comprising:
receiving, by a terminal, a set of Channel State Information, CSI, feedback configurations, and configuration information for feeding back CSI based upon the set of CSI feedback configurations, indicated by a base station; and
measuring and feeding back, by the terminal, CSI according to the set of CSI feedback configurations, and the configuration information;
wherein the set of CSI feedback configurations comprises at least one CSI feedback configuration, and the CSI feedback configuration is a downlink signal configuration for measuring and feeding back downlink CSI;

wherein the configuration information comprises indication information of a downlink channel information item to be fed back over a Physical Uplink Control Channel, PUCCH;

wherein the indication information of a downlink channel information item to be fed back over a PUCCH is:

first indication information to be fed back over a PUCCH, which comprises positional information and CSI corresponding to the optimum CSI feedback configuration in the set of CSI feedback configurations; or second indication information to be fed back over a PUCCH, which comprises positional information and CSI corresponding to a CSI feedback configuration, specified by the base station, in the set of CSI feedback configurations; or third indication information to be fed back over a PUCCH, which comprises positional information and CSI corresponding to each CSI feedback configuration in the set of CSI feedback configurations.

2. The method according to claim 1, wherein the CSI feedback configuration is a CSI process, a non-zero power CSI measurement resource configuration, or an interference measurement resource configuration.

3. The method according to claim 1, wherein the configuration information further comprises any one or more of:

transmission mode indication information, wherein the transmission mode is a beamformed CSI measurement pilot transmission mode, or a non-precoded CSI measurement pilot transmission mode;

CSI feedback mode indication information, wherein the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;

indication information of a downlink channel information item to be fed back over a Physical Uplink Shared Channel PUSCH;

codebook indication information of a codebook to be used in calculating CSI; and a codebook subset restriction indicator indicating codewords currently available in a predefined codebook to be used in calculating CSI.

4. The method according to claim 3, wherein the indication information of a downlink channel information item to be fed back over a PUSCH is:

first indication information to be fed back over a PUSCH, which comprises positional information and CSI corresponding to the optimum CSI feedback configuration in the set of CSI feedback configurations; or second indication information to be fed back over a PUSCH, which comprises positional information of the optimum CSI feedback configuration in the set of CSI feedback configurations; or third indication information to be fed back over a PUSCH, which comprises CSI corresponding to a CSI feedback configuration, corresponding to latest reported positional information, in the set of CSI feedback configurations; or fourth indication information to be fed back over a PUSCH, which comprises CSI corresponding to a CSI feedback configuration, specified by the base station, in the set of CSI feedback configurations; or fifth indication information to be fed back over a PUSCH, which comprises CSI corresponding to each CSI feedback configuration in the set of CSI feedback configurations.

5. The method according to claim 3, wherein if the configuration information comprises the transmission mode indication information, then reporting, by the terminal, CSI based upon the configuration information, comprises:

if it is determined that the transmission mode indication information indicates the beamformed CSI measurement pilot transmission mode, then reporting, by the terminal, positional information and CSI corresponding to the optimum CSI feedback configuration in the set of CSI feedback configurations; and if it is determined that the transmission mode indication information indicates the non-precoded CSI measurement pilot transmission mode, then reporting, by the terminal, CSI corresponding to each CSI feedback configuration in the set of CSI feedback configurations;

and/or wherein receiving, by the terminal, the set of CSI feedback configurations, and the configuration information for feeding back CSI based upon the set of CSI feedback configurations, indicated by the base station comprises:

if the configuration information comprises the transmission mode indication information, then determining, by the terminal, a quantity of CSI feedback configurations corresponding to a transmission mode indicated by the transmission mode indication information, and receiving indication information of the CSI feedback configuration indicated by the base station according to the quantity of CSI feedback configurations;

and/or wherein if the configuration information comprises the CSI feedback mode indication information, then reporting, by the terminal, CSI based upon the configuration information comprises:

reporting, by the terminal, CSI corresponding to each CSI feedback configuration according to the CSI feedback mode indication information, or reporting positional information and CSI corresponding to the optimum CSI feedback configuration according to the CSI feedback mode indication information.

6. The method according to claim 1, wherein reporting, by the terminal, CSI based upon the configuration information comprises:

if it is determined that the indication information of a downlink channel information item to be fed back over a PUCCH is the first indication information, reporting over a PUCCH, by the terminal, positional information and CSI corresponding to the optimum CSI feedback configuration in the set of CSI feedback configurations;

if it is determined that the indication information of a downlink channel information item to be fed back over a PUCCH is the second indication information, reporting over a PUCCH, by the terminal, positional information and CSI corresponding to the CSI feedback configuration, specified by the base station, in the set of CSI feedback configurations; and if it is determined that the indication information of a downlink channel information item to be fed back over a PUCCH is the third indication information, reporting over a PUCCH, by the terminal, positional information and CSI corresponding to each CSI feedback configuration in the set of CSI feedback configurations.

7. The method according to claim 4, wherein if the configuration information comprises the indication information of a downlink channel information item to be fed back over a PUSCH, then reporting, by the terminal, CSI based upon the configuration information comprises:
- if it is determined that the indication information of a downlink channel information item to be fed back over a PUSCH is the first indication information, then reporting over a PUSCH, by the terminal, positional information and CSI corresponding to the optimum CSI feedback configuration in the set of CSI feedback configurations;
- if it is determined that the indication information of a downlink channel information item to be fed back over a PUSCH is the second indication information, then reporting over a PUSCH, by the terminal, positional information of the optimum CSI feedback configuration in the set of CSI feedback configurations;
- if it is determined that the indication information of a downlink channel information item to be fed back over a PUSCH is the third indication information, then reporting over a PUSCH, by the terminal, CSI corresponding to a CSI feedback configuration, corresponding to latest reported positional information, in the set of CSI feedback configurations;
- if it is determined that the indication information of a downlink channel information item to be fed back over a PUSCH is the fourth indication information, then reporting over a PUSCH, by the terminal, CSI corresponding to a CSI feedback configuration, specified by the base station, in the set of CSI feedback configurations; and
- if it is determined that the indication information of a downlink channel information item to be fed back over a PUSCH is the fifth indication information, then reporting over a PUSCH, by the terminal, CSI corresponding to each CSI feedback configuration in the set of CSI feedback configurations.

8. The method according to claim 3, wherein if the configuration information comprises the codebook indication information, then the method further comprises:
- determining, by the terminal, a codebook to be used in calculating CSI during CSI measurement, according to the codebook indication information;
- wherein determining, by the terminal, the codebook to be used in calculating CSI during the CSI measurement, according to the codebook indication information comprises:
- determining, by the terminal, a codebook in a set of preset codebooks, an index of which is the codebook indication information, and taking the determined codebook as the codebook to be used in calculating CSI;
or
- determining, by the terminal, a subset of a preset codebook according to values of respective bits in the codebook indication information, and taking the determined subset as the codebook to be used in calculating CSI, wherein each bit in the code indication information corresponds to a codeword in the preset codebook;
or
- obtaining, by the terminal, a generation matrix of a target codebook according to the codebook indication information, determining the target codebook according to the generation matrix and a preset codebook, and taking the target codebook as the codebook to be used in calculating CSI;
or
- obtaining, by the terminal, generation parameters of a target codebook according to the codebook indication information, and generating the target codebook according to the generation parameters of the codebook and a preset rule;

and/or
wherein if the configuration information comprises the codebook subset restriction indicator, then the method further comprises:
- determining, by the terminal, codewords currently available in a predefined codebook according to the codebook subset restriction indicator.

9. A method for obtaining channel state information in a Full-Dimension, FD, Multiple Input Multiple Output, MIMO, system, comprising:
- transmitting, by a base station, a set of Channel State Information, CSI, feedback configurations, and configuration information for feeding back CSI based upon the set of CSI feedback configurations, to a terminal; and
- receiving, by the base station, information fed back by the terminal according to the set of CSI feedback configurations, and the configuration information;
- wherein the set of CSI feedback configurations comprises at least one CSI feedback configuration, and the CSI feedback configuration is a downlink signal configuration for measuring and feeding back downlink CSI;
- wherein the configuration information comprises indication information of a downlink channel information item to be fed back over a Physical Uplink Control Channel, PUCCH;
- wherein the indication information of a downlink channel information item to be fed back over a PUCCH is:
- first indication information to be fed back over a PUCCH, which comprises positional information and CSI corresponding to the optimum CSI feedback configuration in the set of CSI feedback configurations; or
- second indication information to be fed back over a PUCCH, which comprises positional information and CSI corresponding to a CSI feedback configuration, specified by the base station, in the set of CSI feedback configurations; or
- third indication information to be fed back over a PUCCH, which comprises positional information and CSI corresponding to each CSI feedback configuration in the set of CSI feedback configurations.

10. The method according to claim 9, wherein the configuration information further comprises any one or more of:
- transmission mode indication information, wherein the transmission mode is a beam-formed CSI measurement pilot transmission mode, or a non-precoded CSI measurement pilot transmission mode;
- CSI feedback mode indication information, wherein the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;
- indication information of a downlink channel information item to be fed back over a Physical Uplink Shared Channel, PUSCH;
- codebook indication information of a codebook to be used in calculating CSI; and
- a codebook subset restriction indicator indicating codewords currently available in a predefined codebook to be used in calculating CSI.

11. A terminal, comprising:
a processor, a memory, and a transceiver;
wherein the transceiver is configured to be controlled by the processor to receive and transmit data, the memory is configured to store preset program, and the processor is configured to read the program in the memory, and to execute the program:
to receive a set of Channel State information, CSI, feedback configurations, and configuration information for feeding back CSI based upon the set of CSI feedback configurations, indicated by a base station; and
to measure and feed back CSI according to the set of CSI back configurations, and the configuration information;
wherein the set of CSI feedback configurations comprises at least one CSI feedback configuration, and the CSI feedback configuration is a downlink signal configuration for measuring and feeding back downlink CSI;
wherein the configuration information comprises indication information of a downlink channel information item to be fed back over a Physical Uplink Control Channel, PUCCH;
wherein the indication information of a downlink channel information item to be fed back over a PUCCH is:
first indication information to be fed back over a PUCCH, which comprises positional information and CSI corresponding to the optimum CSI feedback configuration in the set of CSI feedback configurations; or
second indication information to be fed back over a PUCCH, which comprises positional information and CSI corresponding to a CSI feedback configuration, specified by the base station, in the set of CSI feedback configurations; or
third indication information to be fed back over a PUCCH, which comprises positional information and CSI corresponding to each CSI feedback configuration in the set of CSI feedback configurations.

12. The terminal according to claim 11, wherein the configuration information further comprises any one or more of:
transmission mode indication information, wherein the transmission mode is a beam-formed CSI measurement pilot transmission mode, or a non-precoded CSI measurement pilot transmission mode;
CSI feedback mode indication information, wherein the CSI feedback mode is to feed back CSI corresponding to all the CSI feedback configurations in the set of CSI feedback configurations, or to feed back positional information and CSI corresponding to the optimum CSI feedback configuration in the set of CSI feedback configurations;
indication information of a downlink channel information item to be fed back over a Physical Uplink Shared Channel, PUSCH;
codebook indication information of a codebook to be used in calculating CSI; and
a codebook subset restriction indicator indicating codewords currently available in a predefined codebook to be used in calculating CSI.

13. The terminal according to claim 12, wherein the indication information of a downlink channel information item to be fed back over a PUSCH is:
first indication information to be fed back over a PUSCH, which comprises positional information of, and CSI corresponding to the optimum CSI feedback configuration in the set of CSI feedback configurations; or
second indication information to be fed back over a PUSCH, which comprises positional information of the optimum CSI feedback configuration in the set of CSI feedback configurations; or
third indication information to be fed back over a PUSCH, which comprises CSI corresponding to a CSI feedback configuration, corresponding to latest reported positional information, in the set of CSI feedback configurations; or
fourth indication information to be fed back over a PUSCH, which comprises CSI corresponding to a CSI feedback configuration, specified by the base station, in the set of CSI feedback configurations; or
fifth indication information to be fed back over a PUSCH, which comprises CSI corresponding to each CSI feedback configuration in the set of CSI feedback configurations.

14. The terminal according to claim 12, wherein the processor is configured:
if the configuration information comprises the transmission mode indication information, and it is determined that the transmission mode indication information indicates the beam-formed CSI measurement pilot transmission mode, to report positional information and CSI corresponding to the optimum CSI feedback configuration in the set of CSI feedback configurations; and
if the configuration information comprises the transmission mode indication information, and it is determined that the transmission mode indication information indicates the non-precoded CSI measurement pilot transmission mode, to report CSI corresponding to each CSI feedback configuration in the set of CSI feedback configurations;
and/or
wherein the processor is configured:
if the configuration information comprises the transmission mode indication information, to determine a quantity of CSI feedback configurations corresponding to a transmission mode indicated by the transmission mode indication information, and to receive indication information of the CSI feedback configuration indicated by the base station according to the quantity of CSI feedback configurations;
and/or
wherein the processor is configured:
if the configuration information comprises the CSI feedback mode indication information, to report CSI corresponding to each CSI feedback configuration according to the CSI feedback mode indication information, or to report positional information and CSI corresponding to the optimum CSI feedback configuration according to the CSI feedback mode indication information.

15. The terminal according to claim 11, wherein the processor is configured:
if it is determined that the indication information of a downlink channel information item to be fed back over a PUCCH is the first indication information, to report positional information and CSI corresponding to the optimum CSI feedback configuration in the set of CSI feedback configurations over a PUCCH;
if it is determined that the indication information of a downlink channel information item to be fed back over a PUCCH is the second indication information, to report positional information and CSI corresponding to the CSI feedback configuration, specified by the base station, in the set of CSI feedback configurations over a PUCCH; and
if it is determined that the indication information of a downlink channel information item to be fed back over a PUCCH is the third indication information, to report positional information and CSI corresponding to each CSI feedback configuration in the set of CSI feedback configurations over a PUCCH.

16. The terminal according to claim 13, wherein the processor is configured:
if the configuration information comprises the indication information of a downlink channel information item to be fed back over a PUSCH, and if it is determined that the indication information of a downlink channel information item to be fed back over a PUSCH is the first indication information, to report positional information and CSI corresponding to the optimum CSI feedback configuration in the set of CSI feedback configurations over a PUSCH;
if it is determined that the indication information of a downlink channel information item to be fed back over a PUSCH is the second indication information, to report positional information of the optimum CSI feedback configuration in the set of CSI feedback configurations over a PUSCH;
if it is determined that the indication information of a downlink channel information item to be fed back over a PUSCH is the third indication information, to report CSI corresponding to a CSI feedback configuration, corresponding to latest reported positional information, in the set of CSI feedback configurations over a PUSCH;
if it is determined that the indication information of a downlink channel information item to be fed back over a PUSCH is the fourth indication information, to report CSI corresponding to a CSI feedback configuration, specified by the base station, in the set of CSI feedback configurations over a PUSCH; and
if it is determined that the indication information of a downlink channel information item to be fed back over a PUSCH is the fifth indication information, to report CSI corresponding to each CSI feedback configuration in the set of CSI feedback configurations over a PUSCH.

17. The terminal according to claim 12, wherein the processor is configured:
if the configuration information comprises the codebook indication information, to determine a codebook to be used in calculating CSI during CSI measurement, according to the codebook indication information;
wherein the processor configured to determine a codebook to be used in calculating CSI during CSI measurement, according to the codebook indication information is further configured:
to determine a codebook in a set of preset codebooks, an index of which is the codebook indication information, and to take the determined codebook as the codebook to be used in calculating CSI;
or
to determine a subset of a preset codebook according to values of respective bits in the codebook indication information, and to take the determined subset as the codebook to be used in calculating CSI, wherein each bit in the code indication information corresponds to a codeword in the preset codebook;
or
to obtain a generation matrix of a target codebook according to the codebook indication information, to determine the target codebook according to the generation matrix and a preset codebook, and to take the target codebook as the codebook to be used in calculating CSI;
or
to obtain generation parameters of a target codebook according to the codebook indication information, and to generate the target codebook according to the generation parameters of the codebook, and a preset rule;
and/or
wherein the processor is configured:
if the configuration information comprises the codebook subset restriction indicator, to determine codewords currently available in a predefined codebook according to the codebook subset restriction indicator.

18. A base station, comprising:
a processor, a memory, and a transceiver;
wherein the transceiver is configured to be controlled by the processor to receive and transmit data, the memory is configured to store preset program, and the processor is configured to read the program in the memory, and to execute the program:
to transmit a set of Channel State Information, CSI, feedback configurations, and configuration information for feeding back CSI based upon the set of CSI feedback configurations, to a terminal; and
to receive information fed back by the terminal according to the set of CSI feedback configurations, and the configuration information,
wherein the set of CSI feedback configurations comprises at least one CSI feedback configuration, and the CSI feedback configuration is a downlink signal configuration for measuring and feeding back downlink CSI;
wherein the configuration information comprises indication information of a downlink channel information item to be fed back over a Physical Uplink Control Channel, PUCCH;
wherein the indication information of a downlink channel information item to be fed back over a PUCCH is:
first indication information to be fed back over a PUCCH, which comprises positional information and CSI corresponding to the optimum CSI feedback configuration in the set of CSI feedback configurations; or
second indication information to be fed back over a PUCCH, which comprises positional information and CSI corresponding to a CSI feedback configuration, specified by the base station, in the set of CSI feedback configurations; or
third indication information to be fed back over a PUCCH, which comprises positional information and CSI corresponding to each CSI feedback configuration in the set of CSI feedback configurations.

* * * * *